(12) United States Patent
Yu et al.

(10) Patent No.: US 6,239,971 B1
(45) Date of Patent: May 29, 2001

(54) COOLING RACK FOR NOTEBOOK COMPUTER

(75) Inventors: Ming-Chuan Yu, Taoyuan; Chung Che Yu, Taipei Hsien, both of (TW)

(73) Assignee: Ming-Chuan Yu, Taoyuan (TW)

( * ) Notice: Subject to any disclaimer, the term of this patent is extended or adjusted under 35 U.S.C. 154(b) by 0 days.

(21) Appl. No.: 09/631,650

(22) Filed: Aug. 2, 2000

(51) Int. Cl.[7] ....................................... H05K 7/20
(52) U.S. Cl. ........................ 361/695; 361/687; 361/688; 361/690; 174/16.1; 165/104.33; 454/184
(58) Field of Search ..................... 361/686, 687, 361/703, 690, 689, 694, 695, 696, 697; 174/15.1, 15.2, 16.1, 16.3; 165/80.3, 104.33; 454/184

(56) References Cited

U.S. PATENT DOCUMENTS

| | | | |
|---|---|---|---|
| 5,562,410 | * 10/1996 | Sachs et al. | 454/184 |
| 5,768,101 | * 6/1998 | Cheng | 361/687 |
| 5,898,569 | * 4/1999 | Bhatia | 361/700 |
| 5,959,836 | * 9/1999 | Bhatia | 361/687 |
| 5,974,556 | * 10/1999 | Jackson et al. | 713/322 |
| 6,042,474 | * 3/2000 | Harvey et al. | 454/184 |

FOREIGN PATENT DOCUMENTS

411163567A * 6/1999 (JP).

* cited by examiner

Primary Examiner—Leo P. Picard
Assistant Examiner—Boris L. Chervinsky
(74) Attorney, Agent, or Firm—Dougherty & Troxell

(57) ABSTRACT

A cooling rack for notebook computer is constructed includes a base frame defining a plurality of open chambers, a cover shell covered on the base frame, the cover shell having a plurality of suction holes corresponding to the open chambers of the base frame, and a plurality of bearing blocks raised from the top side wall thereof and adapted to support a notebook computer above the top side wall of the cover shell, and a plurality of fans respectively installed in the open chambers in the base frame and controlled to induce currents in direction from the suction holes of the cover shell to the air outlet of each open chamber of the base frame for carrying heat away from the supported notebook computer.

3 Claims, 6 Drawing Sheets

COOLING RACK FOR NOTEBOOK COMPUTER

BACKGROUND OF THE INVENTION

The present invention relates to a rack for supporting a notebook computer above a flat surface, and more particularly to a cooling rack for notebook computer, which effectively carries heat away from the notebook computer supported thereon during the operation of the notebook computer.

Regular notebook computers are compact, and require less operation space. However, the mainframe of a notebook computer produces much heat during its operation. When operating a notebook computer on a flat surface, heat cannot be quickly carried away from the bottom side of the notebook computer. If the temperature of the mainframe of a notebook computer surpasses a critical lever for a certain length of time, the internal circuit and component parts of the mainframe of the notebook computer will be damaged.

SUMMARY OF THE INVENTION

The present invention has been accomplished under the circumstances in view. It is the main object of the present invention to provide a cooling rack for notebook computer, which is practical for use to support a notebook computer on a flat surface, and to effectively carry heat away from the notebook computer supported thereof. According to one aspect of the present invention, the cooling rack for notebook computer comprises a base frame defining a plurality of open chambers, a cover shell covered on the base frame and adapted to support a notebook computer, and a plurality of fans respectively installed in the open chambers of the base frame corresponding to respective suction holes on the cover shell and operated to induce currents of air in direction from the suction holes of the cover shell through the open chambers to the outside of the cooling rack. According to another aspect of the present invention, the cover shell comprises a plurality of bearing blocks adapted to support a notebook computer above the top side wall of the cover shell.

DETAILED DESCRIPTION OF THE PREFERRED EMBODIMENT

Figure 1:
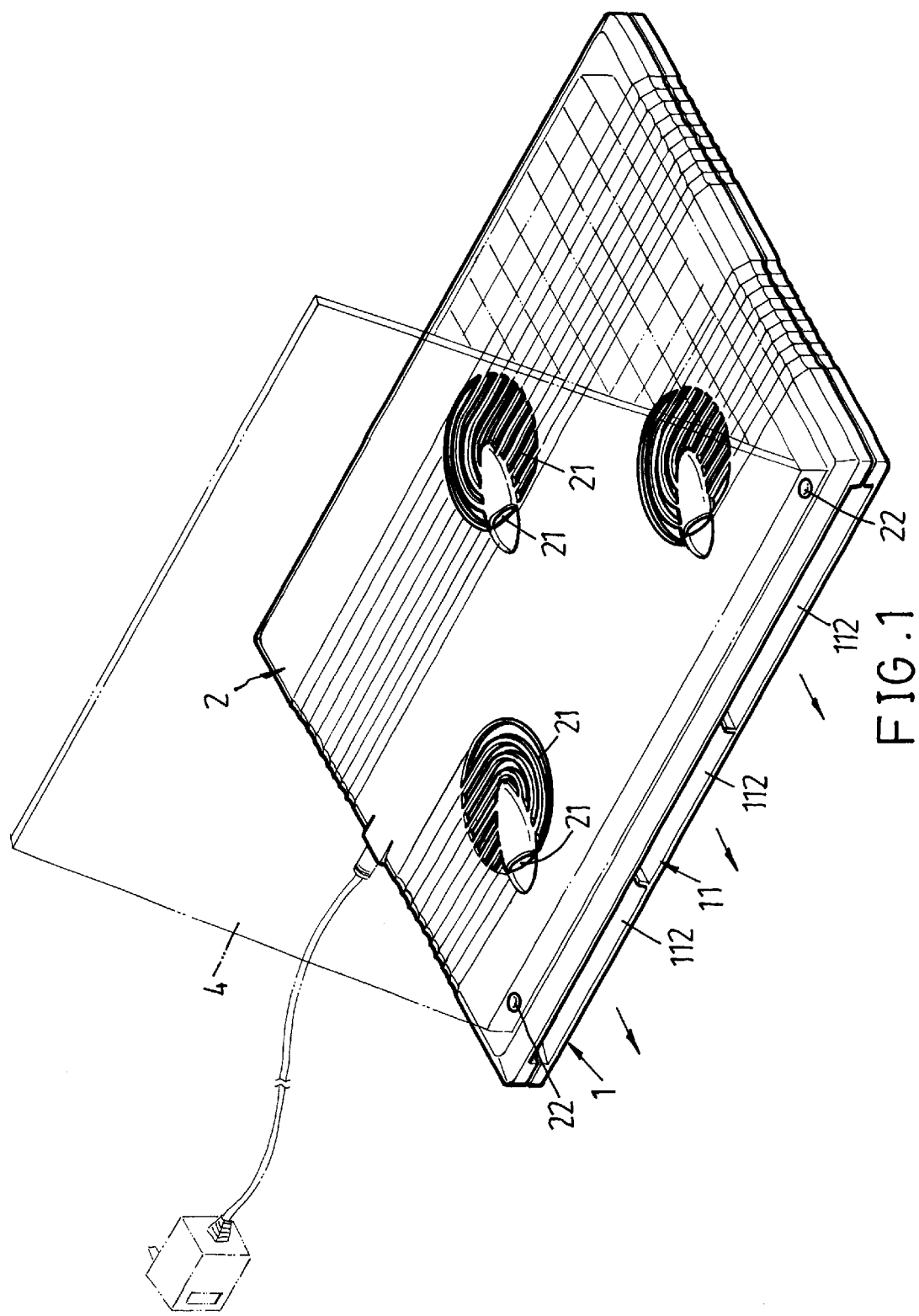
FIG. 1 is an applied view of the present invention, showing the cooling rack used with a notebook computer.
Figure 2:
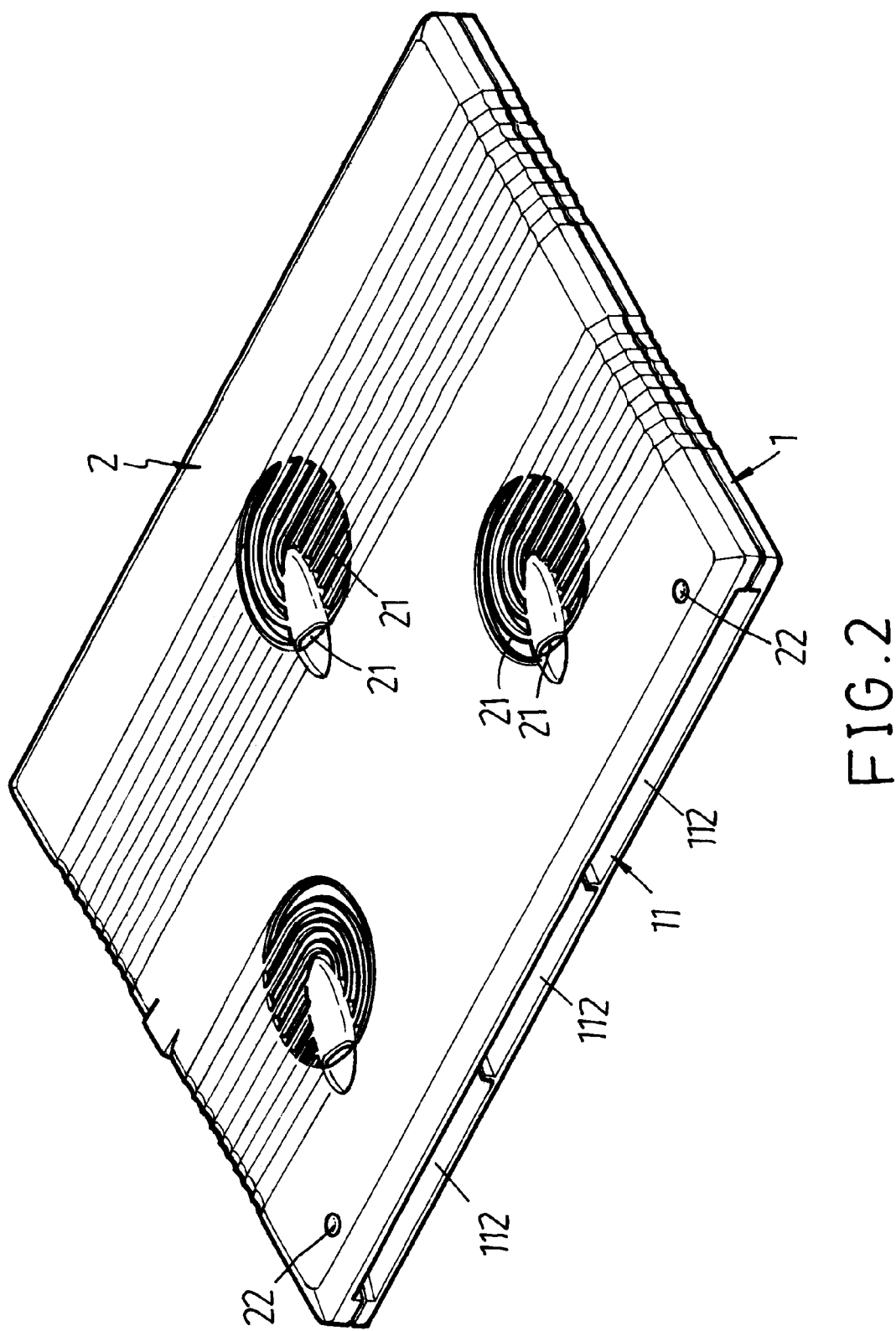
FIG. 2 is an elevational view of the cooling rack for notebook computer according to the present invention.

Referring to FIGS. from 1 through 3, a cooling rack for notebook computer in accordance with the present invention is generally comprised of a base frame 1, a cover shell 2, and a plurality of fans 3. The cover shell 2 is a flat shell covered on the base frame 1, comprising a plurality of bearing blocks 22 raised from the top side wall thereof and adapted to support a notebook computer 4, and a plurality of suction holes 21. The base frame 1 comprises a plurality of open chambers 11 of substantially R-shaped profile arranged in parallel corresponding to the suction holes 21 of the cover shell 2 and extended to one side thereof, and a plurality of tubular mounting rods 115 respectively fastened to the cover shell 2 by screws 116. Each open chamber 11 comprises a fan receiving space 111, an upright shaft 114 disposed at the center of the fan receiving space 111 and adapted to hold one fan 3, and an air outlet 112 adapted to guide currents of air from the fan receiving space 111 to the outside of the base frame 1. A rechargeable battery 6 and an electronic control circuit board 5 are installed in the base frame 1, and adapted to control the operation of the fans 3. Electric power connectors 113 are installed in the base frame 1. The electric power connectors 113 include one power input connector adapted to receive AC power supply from the socket for cigarette lighter of a motor vehicle for the cooling rack (the rechargeable battery 7 and the fans 3), and a power output connector for providing the necessary working voltage to the notebook computer 4.

Referring to FIGS. from 4 through 6, the notebook computer 4 is supported on the bearing blocks 22 of the cover shell 2, and the fans 3 are operated to induce currents of air, enabling heat to be quickly carried away from the notebook computer 4 through the suction holes 21 of the cover shell 2 and the air outlet 112 of each open chamber 11 of the base frame 1. Because the bearing blocks 22 keeps the bottom side wall of the notebook computer 4 from touching the top side wall of the cover shell 2, air is allowed to circulate through the space between the bottom side wall of the notebook computer 4 and the top side wall of the cover shell 2, enabling the temperature of the notebook computer 4 to be quickly reduced.

Figure 3:
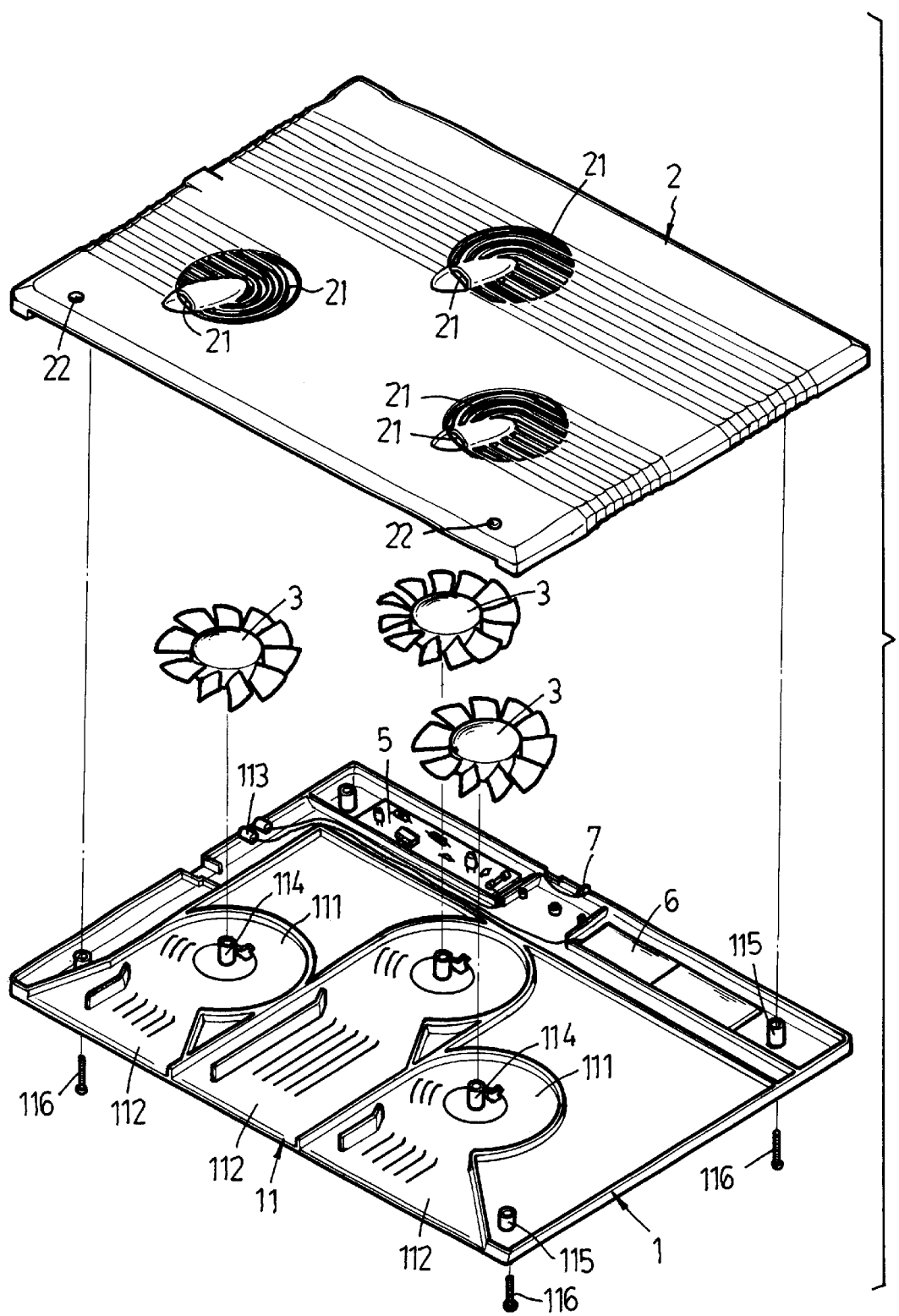
FIG. 3 is an exploded view of the cooking rack for notebook computer according to the present invention.
Figure 4:
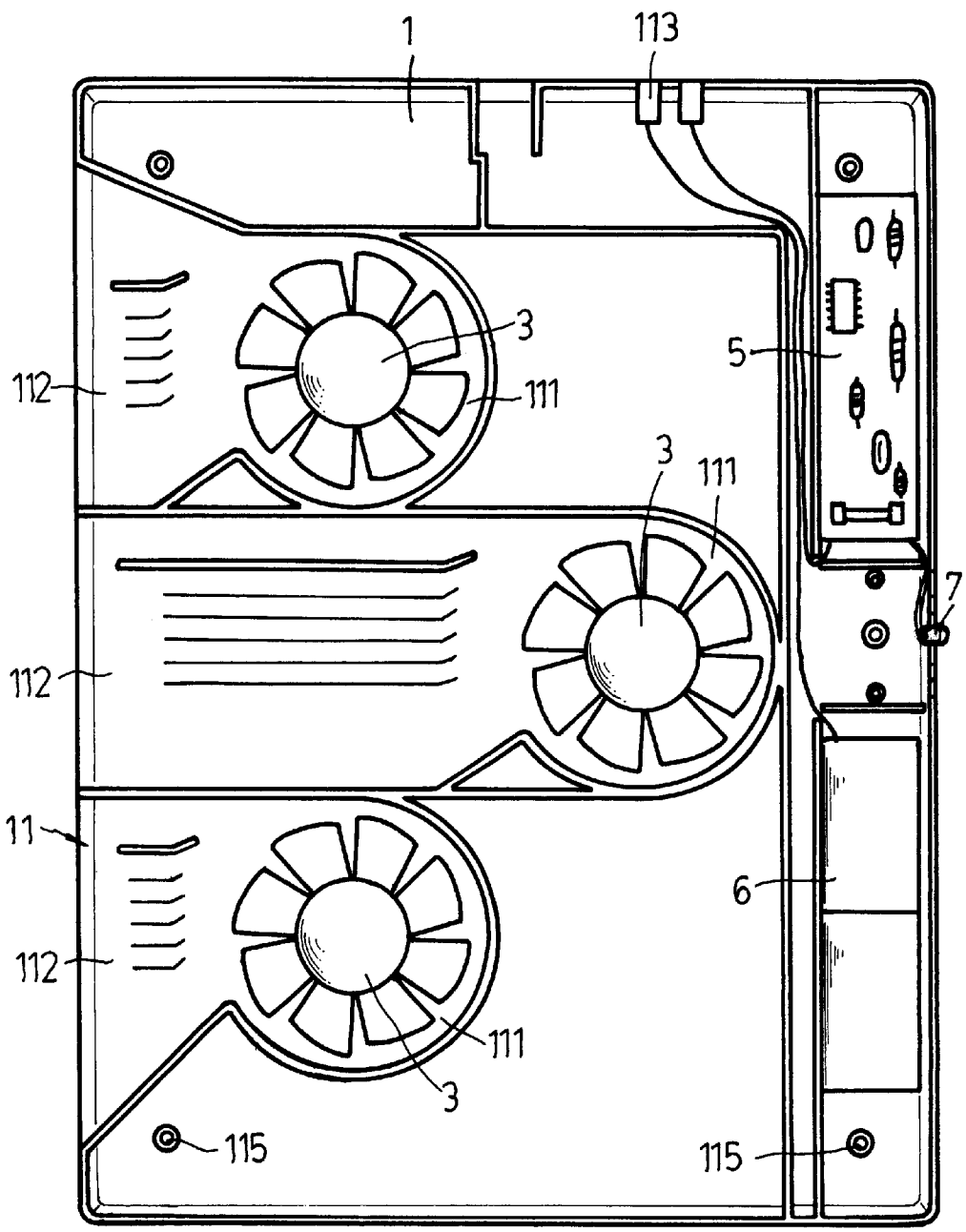
FIG. 4 is a top plain view of the cooking rack for notebook computer according to the present invention.
Figure 5:
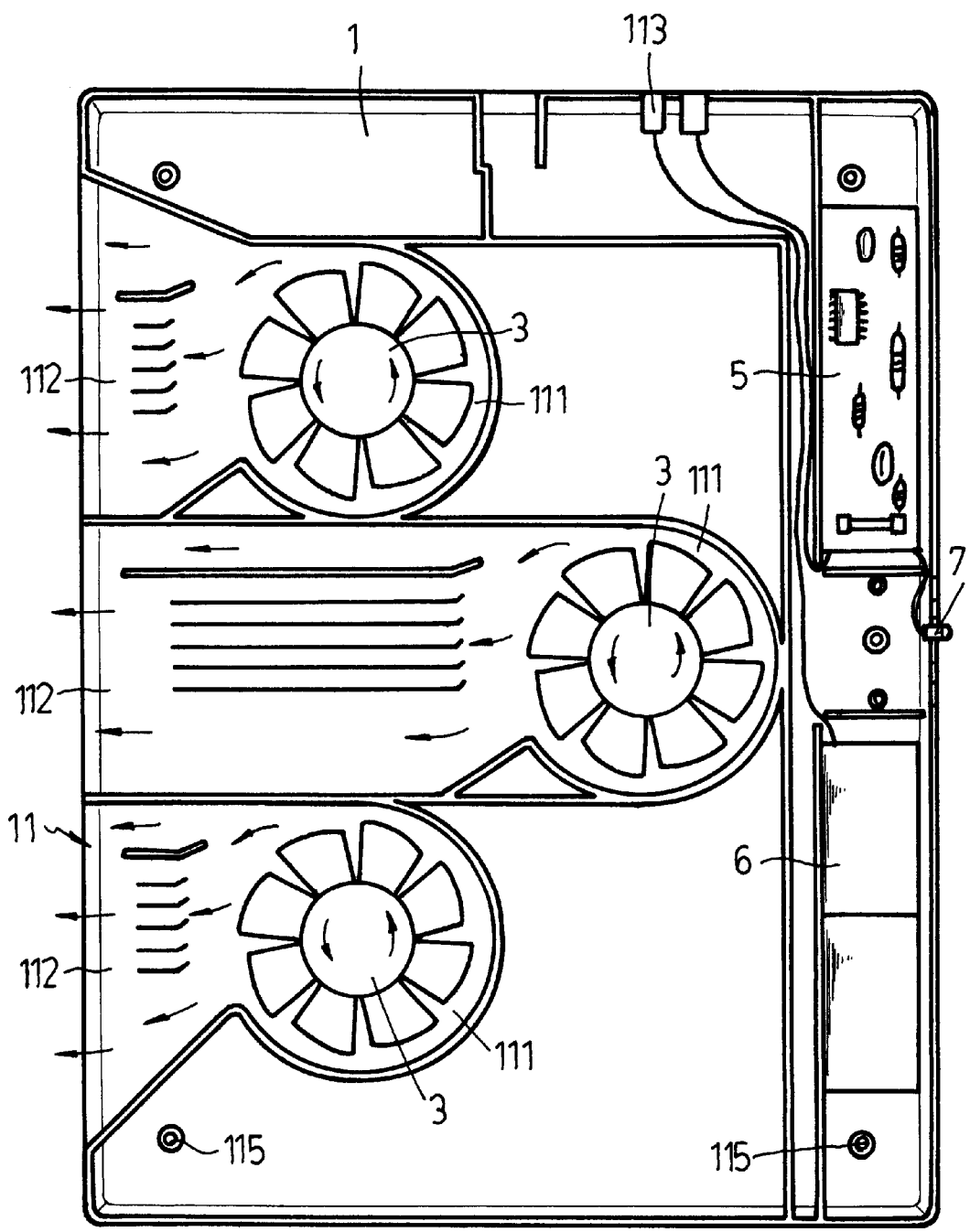
FIG. 5 is a schematic drawing showing the fans of the cooking rack operated according to the present invention.
Figure 6:
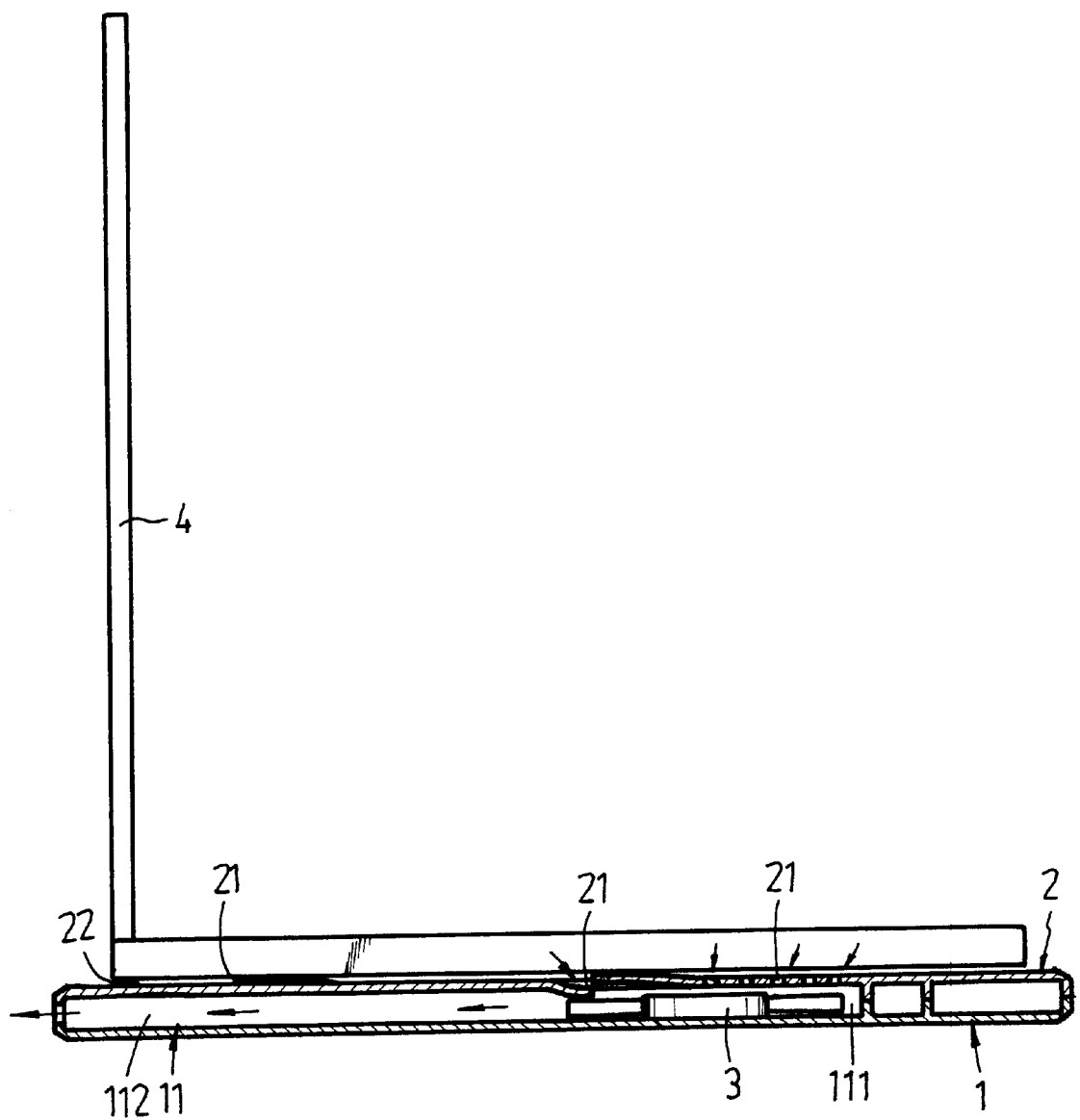
FIG. 6 is a side view in section of the present invention, showing a notebook computer supported on the cooking rack and the fan operated.

Referring to FIG. 3 again, an indicator light 7 is installed in the front side of the cooling rack to indicate the operation status of the fans 3.

While only one embodiment of the present invention has been shown and described, it will be understood that various modifications and changes could be made thereunto without departing from the spirit and scope of the invention disclosed.

What the invention claimed is:

1. A cooling rack
   a base frame, said base frame comprising open chambers and extended to one side thereof, said open chambers each comprising a fan receiving space, an upright shaft disposed at the center of said fan receiving space, and an air outlet adapted to guide currents of air from said fan receiving space to the outside of said base frame;
   a plurality of fans respectively mounted on the shaft in the fan receiving space of each open chamber of said base frame and operated to induce currents of air in direction from the fan receiving space of each open chamber toward the air outlet of each open chamber; and
   a cover shell covered on said base frame over said fans and adapted to support a notebook computer for enabling heat to be carried away from the notebook computer, said cover shell comprising a plurality of suction holes respectively aimed at said fans.

2. The cooling rack for notebook computer of claim 1 wherein said cover shell comprises a plurality of bearing blocks raised from the top side wall thereof and adapted to support a notebook computer above the top side wall of said cover shell.

3. The cooling rack for notebook computer of claim 1 further comprising an electronic control circuit board installed in said base frame and adapted to control the operation of said fans, battery means installed in said base frame and adapted to provide the necessary working voltage to said fans, indicator light means installed in said base frame and connected to said fans and adapted to indicate the operation status of said fans, and electric power connector means installed in said base frame for input and output of power supply.

* * * * *